United States Patent [19]

Higgins

[11] Patent Number: 4,485,523

[45] Date of Patent: Dec. 4, 1984

[54] RV DRAPERY MOUNT AND LIGHT FIXTURE

[75] Inventor: Bob J. Higgins, Elkhart, Ind.

[73] Assignee: Trans-Aire International, Inc., Elkhart, Ind.

[21] Appl. No.: 379,119

[22] Filed: May 17, 1982

[51] Int. Cl.³ .................... E05D 11/00; E05D 13/02
[52] U.S. Cl. .................... 16/94 D; 16/95 D; 362/74
[58] Field of Search ............ 16/87.4 R, 94 R, 94 D, 16/95 R, 95 W, 95 D, 95 DW, 96 R, 96 D, 96 L, 223; 160/392, 395; 105/324, 314, 329 R; 296/138, 140, 141; 362/61, 74, 82; 340/815.2, 815.14, 815.15, 815.16

[56] References Cited

U.S. PATENT DOCUMENTS

| | | | |
|---|---|---|---|
| 2,102,944 | 12/1937 | Doane | 362/74 |
| 2,105,447 | 1/1938 | Arenberg | 362/74 |
| 2,145,222 | 1/1939 | Gunter | 362/74 X |
| 2,213,912 | 9/1940 | Hooper | 160/395 |
| 2,287,667 | 6/1942 | Brown | 160/392 X |
| 2,934,782 | 5/1960 | Wootton | 16/93 D |
| 3,273,197 | 9/1966 | Ford | 16/95 D X |
| 3,818,543 | 6/1974 | Baker, Sr. | 16/94 D X |
| 3,818,544 | 6/1974 | Helmer et al. | 16/93 D X |
| 3,871,082 | 3/1975 | Pflum | 16/93 D X |
| 4,053,008 | 10/1977 | Baslow | 160/392 X |
| 4,112,643 | 9/1978 | Decker | 160/395 X |
| 4,120,474 | 10/1978 | Hurley | 16/96 D X |

FOREIGN PATENT DOCUMENTS 1262879 2/1972 United Kingdom ............... 296/138

Primary Examiner—Fred A. Silverberg
Attorney, Agent, or Firm—Gordon W. Hueschen

[57] ABSTRACT

There is disclosed an RV drapery mount, optionally also constituting a light fixture, which comprises an extrusion having a base portion having non-symmetrical portions above and below the base portion characterized in that the upper portion is shaped to form with the ceiling and wall of the RV a closed channel and the bottom portion is shaped to form an open channel, the front portion of which comprises a fabric cover beading receptor and the back portion of which comprises a drapery hanger track which is opposed to said receptor. A fabric cover is anchored in the receptor, wrapped around the front of the extrusion and over the top thereof and anchored by an anchoring member fastened under the top of the extrusion. The front wall may have an opening therein for a light fixture.

10 Claims, 2 Drawing Figures

RV DRAPERY MOUNT AND LIGHT FIXTURE

BACKGROUND OF THE INVENTION

Field of Invention and Prior Art

The invention relates to an RV drapery mount, optionally also constituting a light fixture, that is to say, to a drapery mount with a light fixture for use in recreational vehicles (RV) and like vehicles.

Recreational vehicles such as vans are customarily equipped with drapes. Heretofore, however, no cheap and effective or attractive means has been available for mounting drapes in recreational vehicles.

OBJECTS OF THE INVENTION

It is an object of the invention therefore to provide a simple inexpensive and effective drapery mount and optional light fixture for recreational vehicles. It is a further object of the invention to provide such a device in which the various features are incorporated therein by an extrusion. Other objects are to avoid the disadvantages of the prior art and to obtain such advantages as will appear as the description proceeds.

SUMMARY OF THE INVENTION

The invention relates to an RV drapery mount with optional light fixture which comprises an extrusion having a base portion having non-symmetrical portions above and below said base portion characterized in that the upper portion is shaped to form with the ceiling and wall of the RV a closed channel and the bottom portion is shaped to form an open channel, the front porton of which comprises a fabric cover beading receptor and the back portion of which comprises a drapery hanger track which is opposed to said receptor.

The invention also includes one or more further features in which the front portion of said bottom portion curves downwardly and inwardly and then upwardly to said receptor, in which the front portion of said upper portion slopes downwardly and outwardly and finally merges tangentially with the curved portion of said bottom portion, in which said upper portion has an inturned ceiling-abutting portion and an upturned wall-abutting portion and the bottom portion has a downturned wall-abutting portion which extends downwardly from said upturned portion, in which said downturned portion is normal to said base portion, said upturned portion forms a negative acute angle with the vertical, said inturned portion forms a negative acute angle with the horizontal, and said front portion forms a negative acute angle with the vertical, in which said inturned portion has a downturned lip which forms a shallow channel with said front portion, in which said drapery hanger track comprises a vertical track member spaced from said downturned portion and connected thereto by a short horizontal portion which projects outwardly from the bottom edge of said downturned portion and is connected to said track between the upper and lower edges thereof, in which said track has out-turned parallel flanges at the top and bottom thereof, in which anchoring means is disposed in said shallow channel and a fabric cover having a beaded edge disposed in said receptor is wrapped around the front of said extrusion and over said inturned portion and fastened by said anchoring means, and in which said front portion has an opening into said closed channel adapted to receive a light fixture.

DESCRIPTION OF THE PREFERRED EMBODIMENTS

Figure 1:
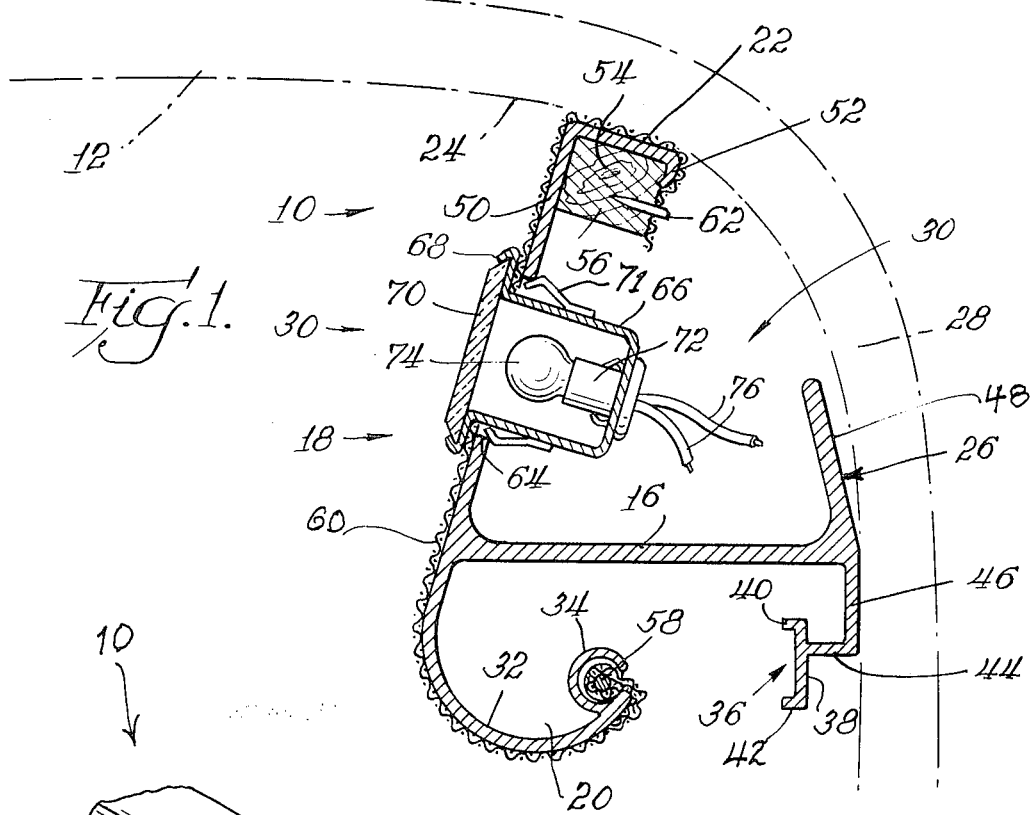
FIG. 1 is a partial section of a recreational vehicle having the RV drapery mount with a light fixture installed therein.
Figure 2:
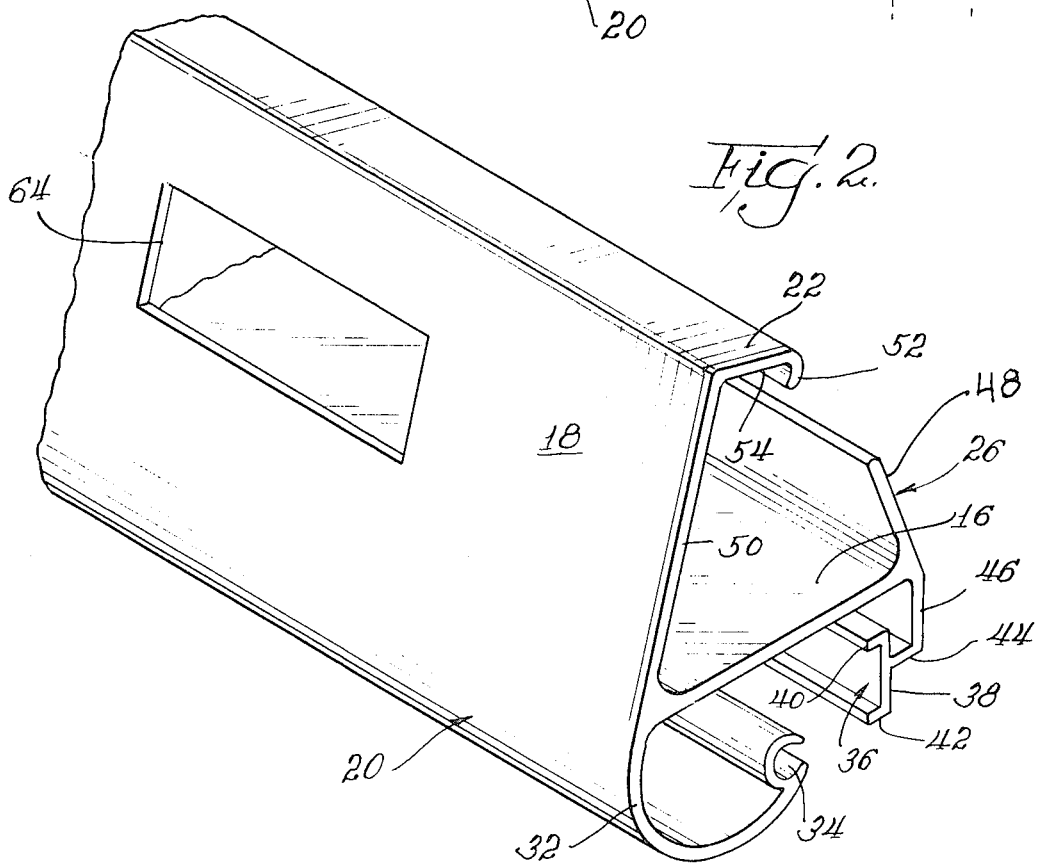
FIG. 2 is an isometric view of the extrusion forming the basis of the RV drapery mount of the invention.

The RV drapery mount 10 with optional light fixture, as illustrated mounted in a recreational vehicle 12 in FIG. 1, is formed from an extrusion as illustrated in FIG. 2. This extrusion suitably is made of aluminum, plastic, or like extrudable material and is composed of a base portion 16 which divides the extrusion into an upper portion 18 and a lower portion 20, a ceiling abutting portion 22 which abuts the ceiling 24, and a wall-abutting portion 26 which abuts the wall 28. Thus, the upper portion 18 forms with the ceiling and wall of the recreational vehicle a closed channel which is suitable for concealing wiring and for housing a suitable light fixture, as illustrated at 30.

The bottom portion 20 has a downwardly, inwardly and then upwardly curved portion 32 which terminates in a fabric cover beading receptor 34. Opposed to the latter and spaced therefrom is a drapery hanger track 36 having a vertically-disposed web 38 and inturned top and bottom flanges 40 and 42. The web 38 is connected by the generally horizontal projection 44 extending from the bottom of the downturned portion 46 of the wall-abutting portion 26. The latter extends downwardly from base member 16 and is generally normal thereto, whereas the upper portion 48 of the wall-abutting portion 26 is upturned at an acute negative angle to the vertical.

The front portion 50 of the upper portion 18 extends upwardly and inwardly from the base 16 at a positive acute angle to the vertical, as best seen in FIG. 2, to the ceiling abutting portion 22. The front portion 50 extends down past the base portion 16 and merges tangentially with the curved portion 32.

The ceiling abutting portion 22 is inturned from the upper edge of front portion 50 and extends downwardly and inwardly at a negative acute angle to the horizontal, as best seen in FIG. 2, and is generally normal to the front portion 50. The edge of the inturned portion 22 has a downturned lip 52 forming a channel 54 adapted to receive the anchoring member 56, which may be of wood, plastic, or like material adapted to receive a fastening member such as a staple 62, or which may anchor fabric 60 by friction.

In the finishing of the mount, suitable cover fabric 60 has one end wrapped around a suitable beading cord 58 or otherwise fastened thereto and brought out around the curved portion 32 up along the front portion 50 over the ceiling-abutting portion 22 down past the lip 52 and fastened to the anchoring member 56 by simple fastners such as the staples 62. The front panel 50 has a suitable opening 64 cut therein adapted to receive the light fixture 30 which comprises a holder 66 adapted to be inserted in the aperture 64 therein, comprising a bezel 68 holding lens 70. The light fixture 30 has suitable light bulb holding means 72 in which a light bulb 74 is mounted. The bulb holding means 72 has suitable wires 76 connected thereto in the usual manner, which lead down the closed channel to a suitable source of energy.

The fixture 30 can be affixed to wall 50 by fastening means, such as frictional detents 71 or sheet metal screws (not shown).

In the use and operation of the device, suitable drape hangers are mounted on the track 36 and suitable drapes are fastened thereto by snaps or like means.

From the foregoing, it is apparent that the present invention provides an RV drapery mount which has the following advantages. It provides means for fabric mounting on its exposed exterior surface, trims the side wall and ceiling juncture, serves as a structural support for the said two RV elements, and can be used for indirect lighting with wiring concealed therein.

It is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

I claim:

1. A drapery mount having front and side walls for a recreational vehicle having a ceiling and a side wall, which comprises:
   an extrusion having a base portion having at the side wall thereof, a wall-abutting portion and, at the front wall thereof, non-symmetrical upper and lower portions which respectively, are above and below said base portion characterized in that said base portion and said upper portion are shaped to form with the ceiling and wall of the recreational vehicle an essentially closed channel and the lower portion is shaped to form an open channel, said open channel having a front portion which comprises a fabric cover beading receptor which is an integral part of said lower portion and a back portion which comprises a drapery hanger track which is mounted on said wall-abutting portion and is opposed to said receptor.

2. A drapery mount of claim 1, in which said lower portion has a front portion which curves downwardly and inwardly and then upwardly to said receptor.

3. A drapery mount of claim 2, in which said upper portion has a front portion which slopes downwardly and outwardly and finally merges tangentially with said lower portion.

4. A drapery mount of claim 1, which further comprises a ceiling-abutting portion which comprises an inturned portion.

5. A drapery mount of claim 4, in which said wall-abutting portion comprises a down-turned portion which is generally normal to said base portion and an upturned portion which forms a negative acute angle with a vertical plane, said inturned portion forms a negative acute angle with a horizontal plane, and said upper portion forms a positive acute angle with said vertical plane, whereby said upturned portion and said upper portion angle toward each other from opposite ends of said base portion.

6. A drapery mount of claim 5, in which said inturned portion has a downturned lip which forms a shallow channel with said upper portion.

7. A drapery mount of claim 6, in which said drapery hanger track comprises a vertical track member spaced from said downturned portion and connected thereto by a short generally horizontal portion which projects outwardly from a bottom edge of said downturned portion and is connected to said track between upper and lower edges thereof.

8. A drapery mount of claim 7, in which said track has out-turned parallel flanges at said upper and lower edges.

9. A drapery mount of claim 6, in which anchoring means is disposed in said shallow channel and a fabric cover having a beaded edge disposed in said receptor is wrapped around the front of said extrusion and over said inturned portion and fastened by said anchoring means.

10. A recreational vehicle having a side wall and a ceiling and a drapery mount therein, said mount comprising an extrusion having a wall-abutting portion, a ceiling-abutting portion, a drapery hanger track portion, and a front face extending from said ceiling-abutting portion to below said drapery hanger track portion so that said drapery hanger track and any drapery hangers thereon are concealed by said front face, in which said wall-abutting portion is connected with said front face by a base portion which divides said extrusion into two compartments, the upper one of which forms, with the side wall and the ceiling of the vehicle, an essentially closed compartment; in which said front face has a removable light fixture mounted in an aperture which opens into said essentially closed compartment; in which said wall-abutting portion has an upturned portion which is opposite said aperture; in which said wall-abutting portion has a downturned portion; and in which said drapery hanger track is mounted on and spaced from said downturned portion, said downturned portion lying flat against the side wall of said vehicle.

* * * * *